(12) United States Patent
Nakamura et al.

(10) Patent No.: US 11,689,624 B2
(45) Date of Patent: Jun. 27, 2023

(54) CONTROL METHOD AND DEVICE

(71) Applicant: FUJITSU LIMITED, Kawasaki (JP)

(72) Inventors: Yosuke Nakamura, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/848,437

(22) Filed: Jun. 24, 2022

(65) Prior Publication Data

US 2022/0321665 A1 Oct. 6, 2022

Related U.S. Application Data

(62) Division of application No. 17/113,141, filed on Dec. 7, 2020, now Pat. No. 11,412,048.

(30) Foreign Application Priority Data

Jan. 14, 2020 (JP) ................................ 2020-004022

(51) Int. Cl.
*H04L 67/56* (2022.01)
*H04L 67/125* (2022.01)
*H04L 67/565* (2022.01)

(52) U.S. Cl.
CPC ............ *H04L 67/125* (2013.01); *H04L 67/56* (2022.05); *H04L 67/565* (2022.05)

(58) Field of Classification Search
CPC ....... H04L 67/02; H04L 67/125; H04L 67/56; H04L 67/565; H04L 69/08; H04W 4/70
See application file for complete search history.

(56) References Cited

U.S. PATENT DOCUMENTS

| 2007/0083763 | A1 | 4/2007 | Itoh et al. |
| 2016/0224806 | A1 | 8/2016 | Takada et al. |
| 2016/3337464 | | 11/2016 | Ericsson et al. |
| 2018/0198604 | A1 | 7/2018 | Hayton et al. |
| 2018/0255089 | A1* | 9/2018 | Wilton ............... H04L 63/1433 |
| 2019/0116158 | A1* | 4/2019 | Patil ................. H04L 69/22 |

(Continued)

FOREIGN PATENT DOCUMENTS

| JP | 2007-110180 A | 4/2007 |
| JP | 2015-058896 A | 3/2015 |
| JP | 2018-121328 A | 8/2018 |

OTHER PUBLICATIONS

EPOA—Office Action of European Patent Application No. 20212777.5 dated May 11, 2022. **US2016/0337464A1 cited in the EPOA was previously submitted in the IDS filed on Jun. 25, 2021.

(Continued)

*Primary Examiner* — Gil H. Lee
(74) *Attorney, Agent, or Firm* — Fujitsu Patent Center

(57) ABSTRACT

A control method of a device executed by a processor, the control method includes transmitting specification information of the device to a terminal apparatus, receiving a request generated based on the specification information from the terminal apparatus, and determining whether to execute the request based on a comparison result between a first communication apparatus through which the request passes until the request reaches the device and a second communication apparatus through which the specification information passes until the specification information reaches the terminal apparatus.

4 Claims, 11 Drawing Sheets

(56) References Cited

U.S. PATENT DOCUMENTS

2021/0075669 A1    3/2021  Hutz
2021/0075869 A1*   3/2021  Li ........................... H04W 4/70

OTHER PUBLICATIONS

Partial European Search Report dated May 3, 2021 tor corresponding to European Patent Application No. 20212777.5. (Total 12 pages).
Extended European Search Report dated Aug. 6, 2021 for corresponding European Patent Application No. 20212777.5 (Total 11 pages) Please note US2016/337464A1 cited herewith, was previously cited in an IDS filed on Jun. 25, 2021*.
USPTO, (Lee) Notice of Allowance, dated Jun. 9, 2022, in parent U.S. Appl. No. 17/113,141 [pending].
USPTO, (Lee) Notice of Allowance, dated May 3, 2022, in parent U.S. Appl. No. 17/113,141 [pending].
USPTO, (Lee) Non-Final Rejection, dated Feb. 3, 2022, in parent U.S. Appl. No. 17/113,141 [pending].
USPTO, (Lee) Advisory Action, dated Dec. 22, 2021, in parent U.S. Appl. No. 17/113,141 [pending].
USPTO, (Lee) Final Rejection, dated Sep. 30, 2021, in parent U.S. Appl. No. 17/113,141 [pending].
USPTO, (Lee) Non-Final Rejection, dated Apr. 28, 2021, in parent U.S. Appl. No. 17/113,141 [pending].
USPTO, (Lee) Requirement for Restriction/Election, dated Mar. 2, 2021, in parent U.S. Appl. No. 17/113,141 [pending].

* cited by examiner

FIG. 6

```
                                                              206
[{"tag":"href"},
 {"tag":"href", "rewrite":"http"}]
...
```

FIG. 7

```
GET /xxx/get_temp/ HTTP/1.1
...
Authorization: basic ********
X-Auth-History: [{"place":"Rproxy","method":"basic"},{"place":"Lproxy","method":"nosec"}]
...
```

CONTROL METHOD AND DEVICE

CROSS-REFERENCE TO RELATED APPLICATION

This application is a divisional of application Ser. No. 17/113,141, filed Dec. 7, 2020, which is based upon and claims the benefit of priority of the prior Japanese Patent Application No. 2020-004022, filed on Jan. 14, 2020, the entire contents of which are incorporated herein by reference.

FIELD

The embodiment discussed herein is related to a control method of a device and the device.

BACKGROUND

The concept of Web of Things (WoT) has been proposed by World Wide Web Consortium (W3C) to enable Web technology to handle all Internet of Things (IoT) devices. In the WoT, it is possible to access an IoT device using a Thing Description (TD) which is for describing a profile such as an application programming interface (API) in a unified format.

Examples of the related art include Japanese Laid-open Patent Publication No. 2007-110180, Japanese Laid-open Patent Publication No. 2015-58896, and Japanese Laid-open Patent Publication No. 2018-121328.

SUMMARY

According to an aspect of the embodiments, a control method, of a device, executed by a processor, the control method includes transmitting specification information of the device to a terminal apparatus, receiving a request generated based on the specification information from the terminal apparatus, and determining whether to execute the request based on a comparison result between a first communication apparatus through which the request passes until the request reaches the device and a second communication apparatus through which the specification information passes until the specification information reaches the terminal apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of a modification target list;

FIG. 7 is a diagram illustrating an example of a HyperText Transfer Protocol (HTTP) request;

DESCRIPTION OF EMBODIMENTS

When an application and an IoT device are present on different networks, a proxy may be provided between the networks to allow the application to handle the IoT.

In the above-described technology, it may be difficult to verify a validity of an access from the application to the IoT device.

For example, the application receives a TD issued by the IoT device and transmits a Web request to the IoT device according to the content described in the received TD. At this time, when a proxy is provided between the application and the IoT device as described above, it is desired to rewrite the TD so that the Web request is able to be directed to the proxy. When the TD is rewritten, the IoT device receives the Web request via the proxy.

Since the TD, which is initially issued from the IoT device, is not written assuming that the Web request passes through the proxy, the IoT device may not be able to determine whether the Web request transmitted via the proxy is valid.

Hereinafter, an embodiment of technology according to the present disclosure that makes it possible to verify the validity of an access from the application to the IoT device will be described in detail with reference to the drawings. The embodiment does not limit the present disclosure. Each embodiment may be combined as appropriate within a scope without contradiction.

Embodiment

Figure 1:
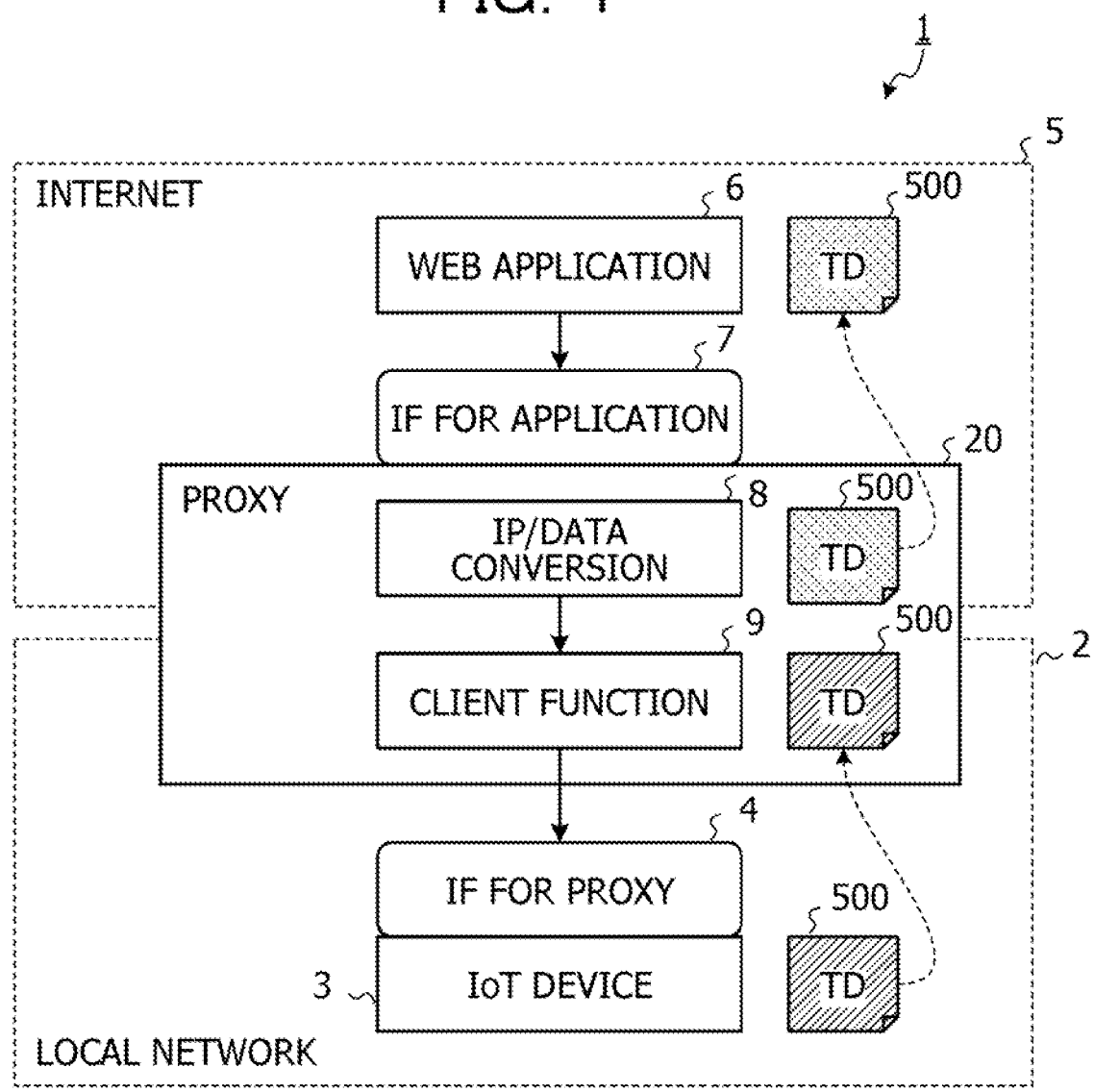
FIG. 1 is a diagram illustrating a disposition example of each apparatus of a WoT system.

First, a WoT system for realizing WoT will be described with reference to FIG. 1. FIG. 1 is a diagram illustrating a disposition example of each function of the WoT system. The system 1 includes an IoT device 3 disposed in a local network 2 and a Web application 6 disposed on the Internet 5.

The Web application 6 may not directly handle the IoT. In such a case, a proxy 20 between the Internet 5 and the local network 2 absorbs the difference in interface (IF) for both sides. For example, the proxy 20 rewrites the IP address, data, and the like by an IP/data conversion 8, and also includes a client function 9. The IoT device 3 transfers the TD 500 to the proxy 20 via an IF for proxy 4.

In the TD 500 output by the IoT device 3, a Uniform Resource Locator (URL) in local is described as API details. The proxy 200 rewrites the TD 500 and transfers the TD 500 to the Web application 6 via an IF for allocation 7. In the TD 500 after the rewrite, a URL in global and the like are described as API details. Various input and output parameters may be described in any TD 500.

In the system illustrated in FIG. 1, for example, the following 4 detections or verifications are desired to be performed in order to ensure the reliability between the Web application 6 and the IoT device 3. For example, (1) detection of an unauthorized rewriting of a TD between a Web application and a proxy, (2) verification of a validity of rewriting of a TD in a proxy, (3) verification of a validity of a TD before rewriting, and (4) verification of the reliability of a Web access.

In one aspect, the purpose of the present embodiment is to perform the detection and verification described above. For example, according to the present embodiment, it is possible to perform the above-described verifications (2) and (4), which have been difficult in the related art.

[Functional Configuration]

Figure 2:
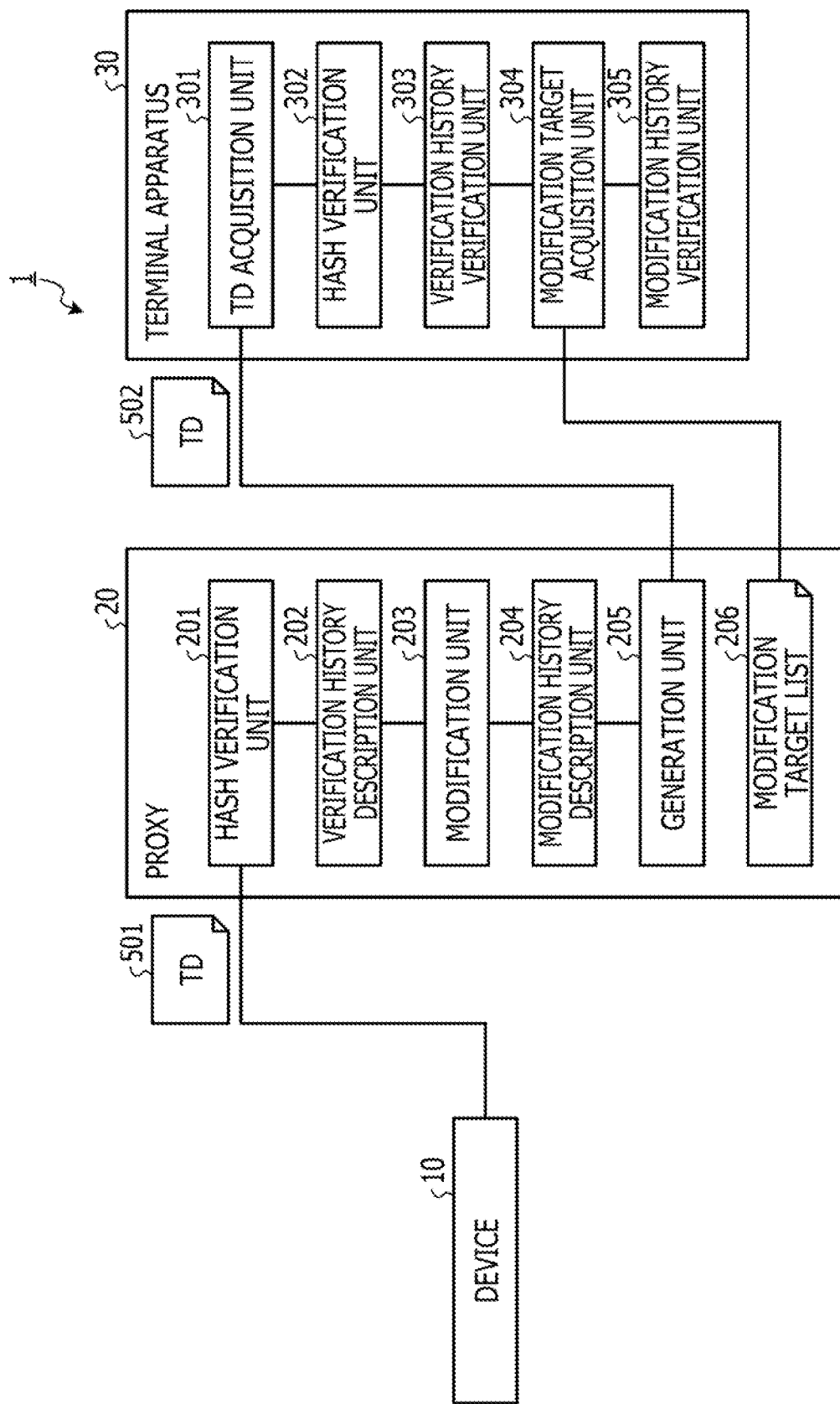
FIG. 2 is a block diagram illustrating a configuration example of a control system.
Figure 3:
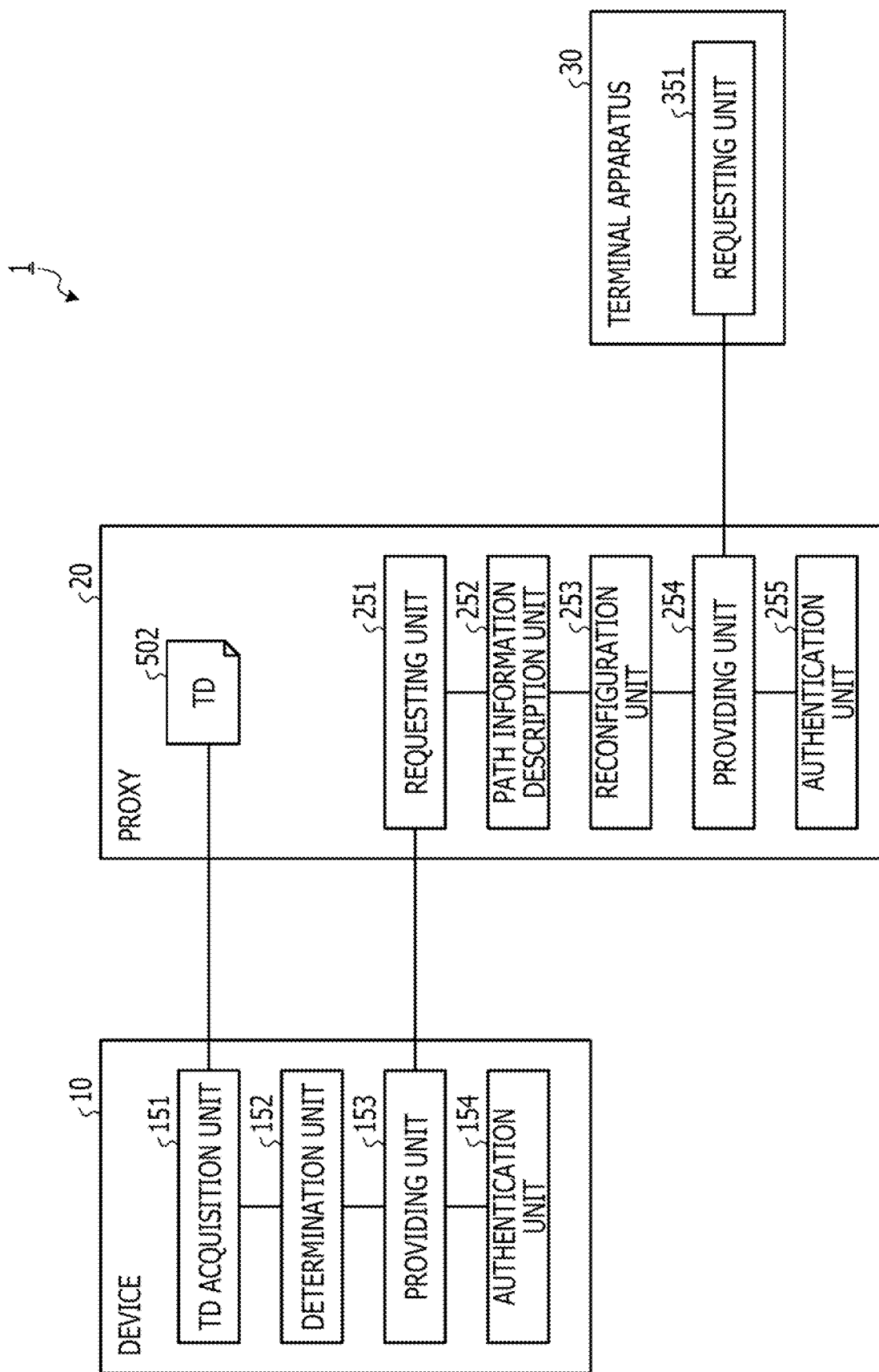
FIG. 3 is a block diagram illustrating a configuration example of the control system.

A configuration of a control system 1 according to the embodiment will be described with reference to FIGS. 2 and 3. FIGS. 2 and 3 are block diagrams illustrating a configuration example of the control system. As illustrated in FIGS. 2 and 3, the control system 1 includes a device 10, a proxy 20, and a terminal apparatus 30.

The device 10 is, for example, an IoT device such as an automobile, a home appliance, a wearable apparatus, or a sensor. The proxy 20 is, for example, a server having a proxy function. The terminal apparatus 30 is a terminal that functions as a client of the Web application. The terminal apparatus 30 may be a server that provides a Web application. Each apparatus of the control system 1 is assumed to have the same function as each apparatus of the system illustrated in FIG. 1.

FIG. 2 illustrates a function of each apparatus used when the device 10 transmits the TD to the terminal apparatus 30 as a processing unit. On the other hand, FIG. 3 illustrates a function of each apparatus used when the terminal apparatus 30 performs a Web access with respect to the device 10 as a processing unit.

[Transmission of TD]

First, each processing unit used when the device 10 transmits the TD will be described. As illustrated in FIG. 2, the proxy 20 includes a hash verification unit 201, a verification history description unit 202, a modification unit 203, a modification history description unit 204, a generation unit 205, and a modification target list 206. The terminal apparatus 30 includes a TD acquisition unit 301, a hash verification unit 302, a verification history verification unit 303, a modification target acquisition unit 304, and a modification history verification unit 305.

The device 10 transmits a TD 501 to the terminal apparatus 30. The device 10 is able to transmit the TD at any time. For example, the device 10 may automatically transmit the TD when the device 10 is added to the network, may transmit the TD by being manually operated or may transmit the TD in response to a request from another apparatus such as the terminal apparatus 30 or the proxy 20. At this time, the TD 501 is received by the proxy 20 on a communication path between the device 10 and the terminal apparatus 30. The hash verification unit 201 verifies a hash of the TD 501 transmitted by the device 10. When the hash verification unit 201 verifies that the TD 501 is valid, the verification history description unit 202 describes the verification history in the TD 501.

The modification unit 203 modifies the content of TD 501 before TD 501 is received by the terminal apparatus 30. The modification history description unit 204 describes, in the TD 501, the content of the modification, which is modified by a modification process, as a modification history. The TD 502 is a thing description in which the modification history is described in the TD 501 by the modification history description unit 204. The TD is an example of specification information. The TD 501 is a TD which is transmitted by the device 10 to the terminal apparatus 30 and is a TD in which information related to a request transmitted by the terminal apparatus 30 to the device 10 is described. The request includes a Web request such as an HTTP request.

For example, when the proxy 20 does not support Websocket but supports HTTP, the modification unit 203 is able to rewrite a protocol of an API described in the TD 501 from Websocket to HTTP. At that time, a modification history description unit 204 describes the fact that the protocol is rewritten in the TD 501 as a modification history.

Figure 4:
FIG. 4 is a diagram illustrating an example of TDs before and after a modification of a protocol.

FIG. 4 is a diagram illustrating an example of TDs before and after the modification of the protocol. The TD 501 is a TD at the time of reception by the proxy 20. The TD 502 is a TD after performing the description of the verification history by the verification history description unit 202, performing the modification of the content by the modification unit 203, and performing the description of the modification history by the modification history description unit 204.

A description tag value included in the TD is an array having an object as an element. It is assumed that the object has one or more "key":"value" pairs. The description tag is an example of a tag for describing Human Readable information, for example, information which is readable by a human.

The verification history description unit 202 describes an object indicating a TD providing source and an object indicating a hash checker in a first element of an array of a description tag. The hash checker is a main body that performed a hash checking and is an apparatus such as a proxy.

""source":"sensor1"" of the TD 502 in FIG. 4 is an object indicating the TD providing source. The object indicates that it is a TD providing source, for example, "source" is "sensor1". The "sensor1" is a character string for identifying the device 10.

""checker":"Lproxy"" of the TD 502 in FIG. 4 is an object indicating a hash checker. The object indicates that it is a hash checker, for example, "checker" is "Lproxy". The "Lproxy" is a character string for identifying the proxy 20. The fact that the verification history is described in the TD indicates that the validity is verified. Therefore, it is not desired that the verification history description unit 202 to explicitly describe whether or not it is valid.

The modification unit 203 rewrites the protocol by modifying a href tag value. As illustrated in FIG. 4, the modification unit 203 rewrites a href tag value from "ws://xxx/get_temp" to "http://xxx/get_temp".

The modification history description unit 204 describes an object indicating a modifier that performed a modification of the TD, an object indicating information before the modification, and an object indicating information after the modification, in a second element of the array of the description tag. The modifier that performed the modification of the TD is a main body that performed a modification of the TD and is an apparatus such as a proxy.

""place":"Rproxy"" of the TD 502 in FIG. 4 is an object indicating a modifier that performed a modification of the TD. The object indicates that it is a modifier, for example, "place" is "Rproxy". The "Rproxy" is a character string for identifying the proxy 20.

""orig-p":"websocket"" of the TD 502 in FIG. 4 is an object indicating information before the modification. The object indicates that it is a proxy before the modification, for example, "orig-p" is "websocket".

""modify-p":"http"" of the TD 502 in FIG. 4 is an object indicating information after the modification. The object indicates that it is a proxy after the modification, for example, "modify-p" is "http".

As described above, the modification history description unit 204 describes the content of the modification, which is modified by the modification process, and information for specifying a tag corresponding to the modified value in the tag value for describing the human-readable information.

The modification unit 203 is able to modify at least any of the values corresponding to the tags included in the TD. The tag in which a value is modified by the modification unit 203 is not limited to the href tag. For example, the modification unit 203 may modify a security tag value representing the authentication method.

Figure 5:
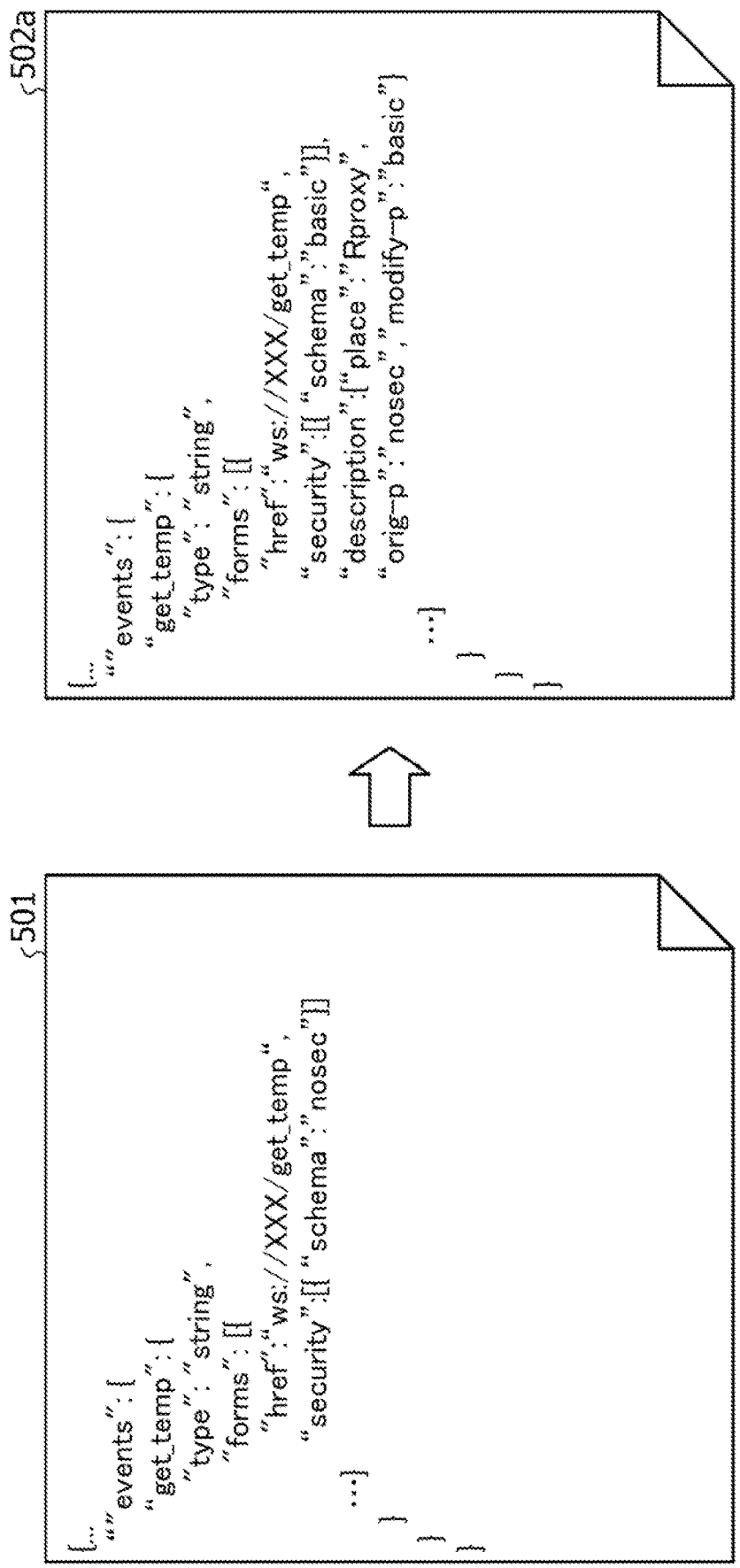
FIG. 5 is a diagram illustrating an example of TDs before and after a modification of an authentication method.

FIG. 5 is a diagram illustrating an example of TDs before and after a modification of an authentication method. In the example in FIG. 5, the modification unit 203 rewrites the security tag value from "{"schema":"nosec"}" to "{"schema":"basic"}". The TD 502a is a TD after performing the description of the verification history by the verification history description unit 202, performing the modification of the content by the modification unit 203, and performing the description of the modification history by the modification history description unit 204.

""place":"Rproxy"" of the TD 502a in FIG. 5 is an object indicating a modifier that performed a modification of the TD. The object indicates that it is a modifier, for example, "place" is "Rproxy".

""orig-p":"nosec"" of the TD 502a in FIG. 5 is an object indicating information before the modification. The object indicates that it is an authentication method before the modification, for example, "orig-p" is "nosec".

""modify-p":"basic"" of the TD 502a in FIG. 5 is an object indicating information after the modification. The object indicates that it is an authentication method after the modification, for example, "modify-p" is "basic".

Returning to FIG. 2, the generation unit 205 generates a hash of the TD 502 in which the modification history is described by the modification history description unit 204. The proxy 20 transmits the TD 502 together with the hash to the terminal apparatus 30.

The TD acquisition unit 301 of the terminal apparatus 30 acquires the TD 502. The hash verification unit 302 verifies a hash of the TD 502 transmitted by the device 10. The verification history verification unit 303 verifies the validity of the verification of the hash performed by the proxy or the like. The verification history verification unit 303 verifies the validity of the verification of the hash performed by the proxy 20 based on the hash verification history of the TD 502.

The modification history verification unit 305 verifies whether the content of the modification indicated by the modification history described in the TD matches the content of the modification permitted in advance. The modification target acquisition unit 304 acquires a modification target list 206 from the proxy 20. The modification target list 206 is information that defines a tag for which a modification is permitted and contents of the modification. The modification target list 206 may be maintained by the terminal apparatus 30 or another apparatus instead of the proxy 20.

Figure 6:
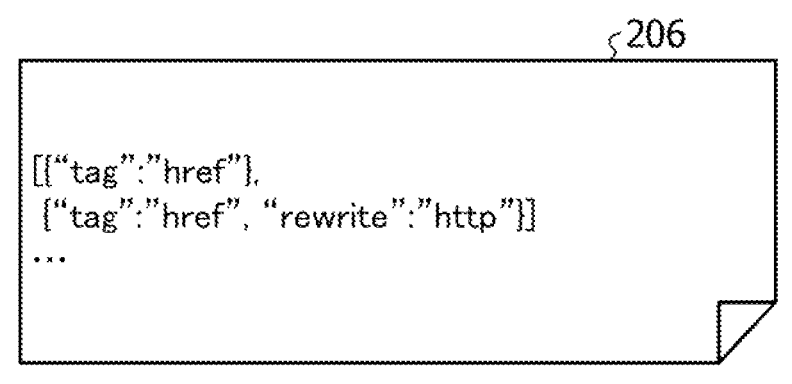

FIG. 6 is a diagram illustrating an example of a modification target list. As illustrated in FIG. 6, the modification target list 206 may include at least a name of a tag for which a modification of a value is permitted, and may further include the content of the modification. "{"tag":"href"}" indicates the fact that the modification of the href tag value is permitted. "{"tag":"href", "rewrite":"http"}" indicates the fact that the modification of the protocol, which is indicated by the href tag, to "http" is permitted.

[Web Access]

Each processing unit used when the terminal apparatus 30 performs a Web access with respect to the device 10 will be described. As illustrated in FIG. 3, the device 10 includes a TD acquisition unit 151, a determination unit 152, a providing unit 153, and an authentication unit 154. The proxy 20 includes a requesting unit 251, a path information description unit 252, a reconfiguration unit 253, a providing unit 254, and an authentication unit 255. The terminal apparatus 30 includes a requesting unit 351.

The requesting unit 351 of the terminal apparatus 30 transmits a request to the device 10. The providing unit 254 of the proxy 20 functions as a Web server. For example, the providing unit 254 receives the request transmitted by the requesting unit 351. The authentication unit 255 performs an authentication of the request received by the providing unit 254. The reconfiguration unit 253 reconfigures the request by using a URL conversion or the like.

The path information description unit 252 describes information related to the path in the request. As illustrated in FIG. 7, the path information description unit 252 describes information in an HTTP request. FIG. 7 is a diagram illustrating an example of the HTTP request.

The path information description unit 252 adds a unique parameter for describing the information to the request. At this time, the path information description unit 252 sets a key starting from "X-" in accordance with the convention of inserting a parameter into a header of an HTTP request. As illustrated in FIG. 7, the path information description unit 252 adds a parameter whose key is "X-Auth-History" to the header of the HTTP request.

The path information description unit 252 describes, for example, an authentication location and an authentication method. Among the objects of the parameter "X-Auth-History" in FIG. 7, "{"place":"Rproxy", "method":"basic"}" indicates that the authentication location is "Rproxy" and the authentication method is "basic". When the HTTP request passes through a plurality of proxies, the path information description unit 252 further adds an object to the parameter "X-Auth-History". "{"place":"Lproxy", "method":"nosec"}" indicates that the authentication location is "Lproxy" and the authentication method is "nosec". The "nosec" indicates that there is no authentication.

The requesting unit 251 functions as a client. For example, the requesting unit 251 transmits a request which is reconfigured by the reconfiguration unit 253 and in which a description is performed by the path information description unit 252, to the device 10.

The providing unit 153 of the device 10 functions as a Web server. For example, the providing unit 153 receives the request transmitted by the requesting unit 251 of the proxy 20. The authentication unit 154 performs an authentication of the request received by the providing unit 153.

The TD acquisition unit 151 acquires a TD in which a communication path of the request transmitted from the terminal apparatus 30 to the device 10 is defined in advance. The TD acquired by the TD acquisition unit 151 is the same as the TD acquired by the terminal apparatus 30. For example, the TD acquisition unit 151 acquires the TD 502 from the proxy 20.

The TD acquisition unit 151 acquires the TD by reading a predetermined parameter which is described in a header of the request transmitted from the terminal apparatus 30 to the device 10. For example, as illustrated in FIG. 7, in the HTTP request, at least the "place" which is information for specifying the proxy 20 on the communication path and the "method" which is an authentication method in each proxy 20 are described. The TD acquisition unit 151 couples to the proxy 20 based on the information read from the HTTP request and acquires the TD 502.

After transmitting the TD of the device 10 to the terminal apparatus 30, when the request generated by using the TD is received from the terminal apparatus 30, the determination unit 152 determines whether to execute the request. The determination unit 152 makes a determination based on a comparison result between a communication apparatus through which the request passes until the request reaches the device 10 and a communication apparatus through which the TD passes until the TD reaches the terminal apparatus 30. The TD is acquired by the TD acquisition unit 151. The request is transmitted by the proxy 20 and received by the providing unit 153.

As illustrated in FIG. 7, the HTTP request indicates that the request has passed at least "Lproxy". As illustrated in FIG. 4, the TD 502 also indicates that the request has passed at least "Lproxy". The determination unit 152 determines to execute the request because at least a part of the proxies on the communication path match.

The determination unit 152 may determine to execute the request when at least a part of the communication path through which a first request passes and the communication path defined by the TD acquired by the TD acquisition unit 151 match. The determination unit 152 may determine to execute the request when the communication path through which a first request passes and the communication path defined by the TD acquired by the TD acquisition unit 151 completely match.

[Flow of Process]

Figure 8:
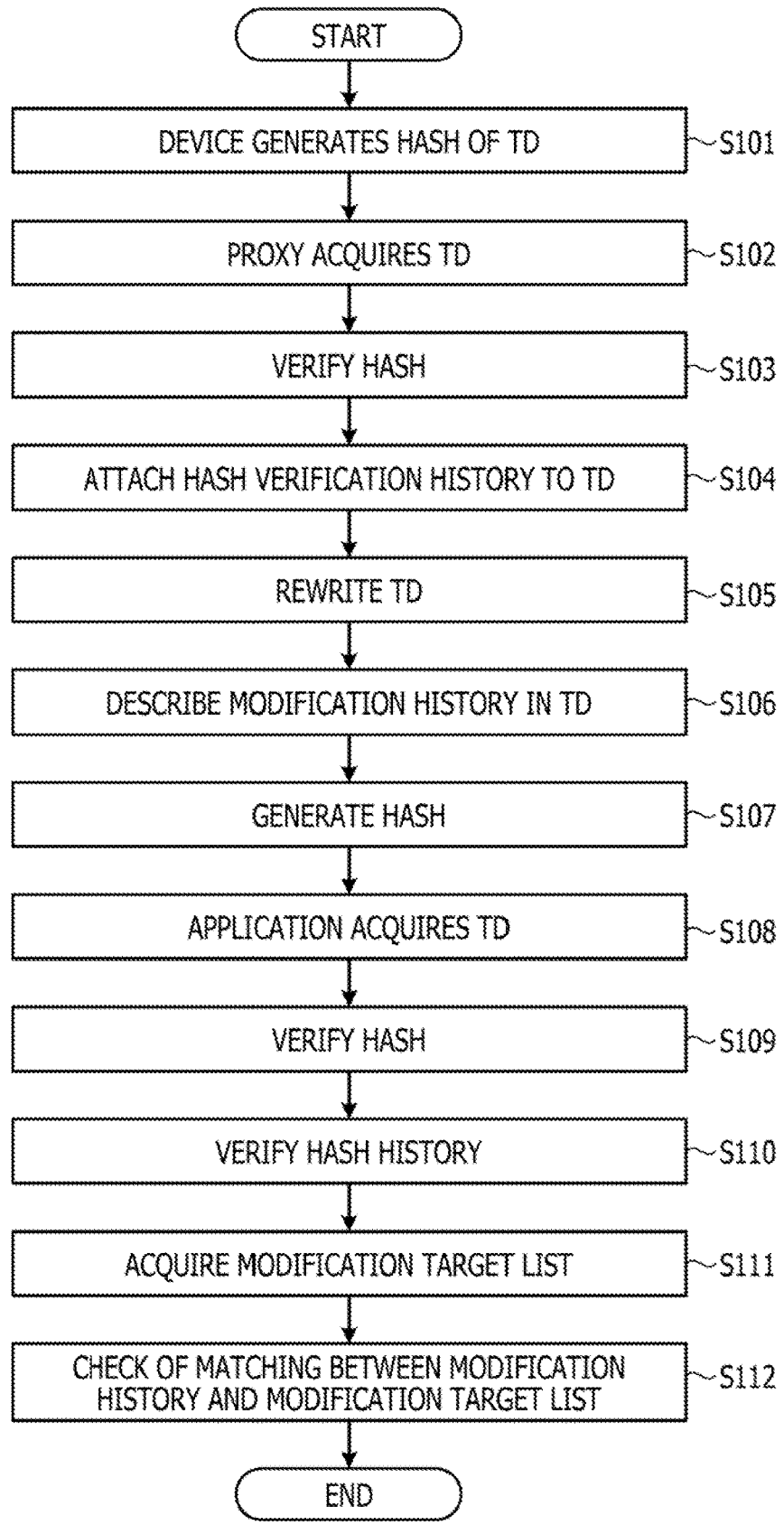
FIG. 8 is a flowchart illustrating a flow of a modification process of a TD.

With reference to FIGS. 2 and 8, a flow of a modification process of a TD when transmitting the TD will be described. FIG. 8 is a flowchart illustrating the flow of the modification process of the TD. The device 10 generates a hash of the TD (operation S101). The proxy 20 acquires the TD (operation S102). The proxy 20 verifies the hash (operation S103). The proxy 20 attaches a hash verification history to the TD (operation S104).

The proxy 20 rewrites the TD (operation S105). For example, the proxy 20 rewrites a protocol, an authentication method, and the like. The proxy 20 describes a modification history in the TD (operation S106). The proxy 20 generates a hash of the TD in which the description of the rewriting and the modification history are performed (operation S107).

The terminal apparatus 30, for example, an application acquires the TD from the proxy 20 (operation S108). The terminal apparatus 30 verifies the hash of the acquired TD (operation S109). The terminal apparatus 30 verifies the hash history (operation S110). The terminal apparatus 30 acquires a modification target list (operation S111) and checks whether the modification history matches the modification target list (operation S112).

Figure 9:
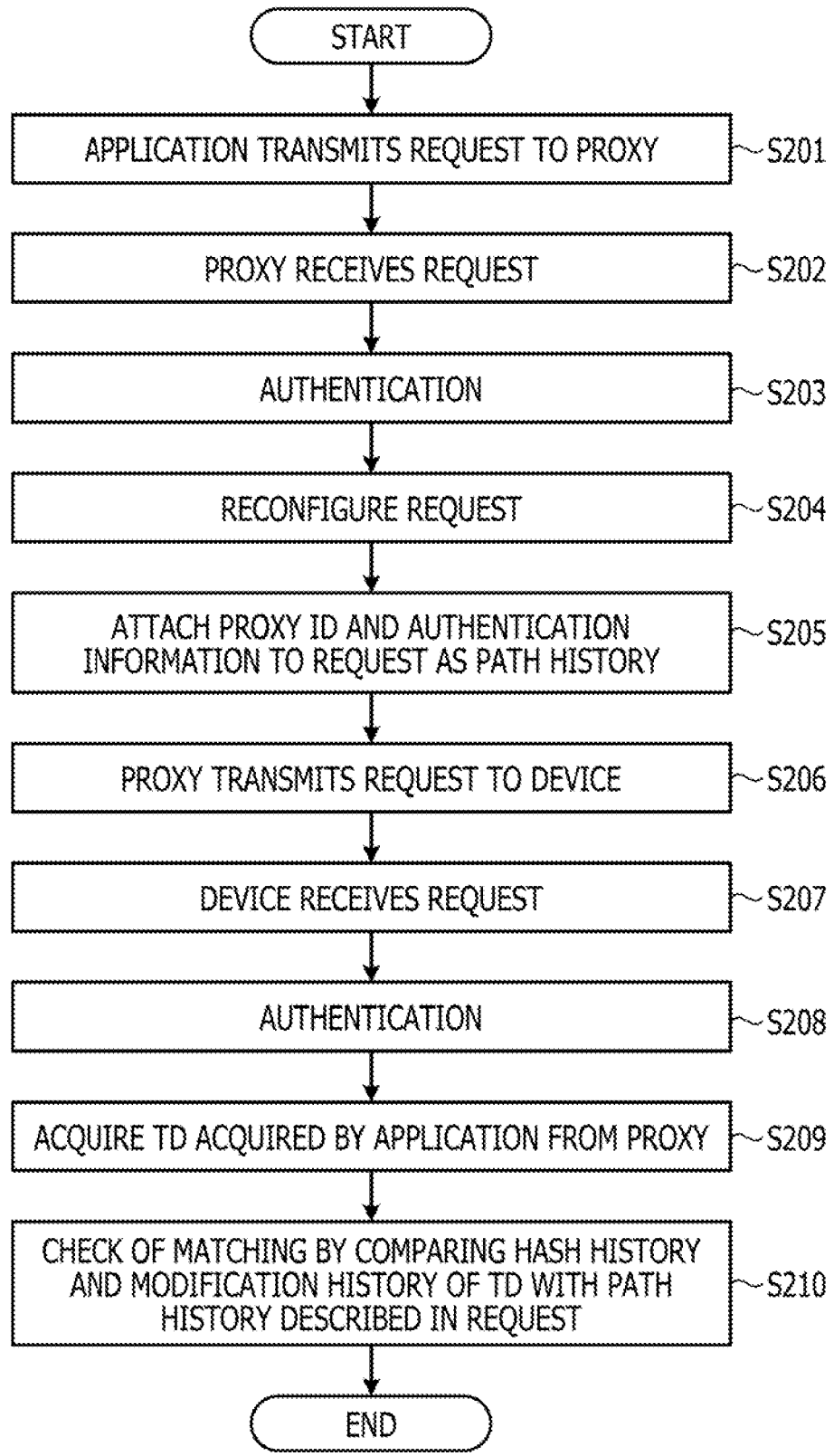
FIG. 9 is a flowchart illustrating a flow of a verification process of a request.

With reference to FIGS. 2 and 9, a verification process of a request when performing a Web access will be described. FIG. 9 is a flowchart illustrating a flow of the verification process of the request. First, the terminal apparatus 30, for example, the application transmits a Web request to the proxy 20 (operation S201).

The proxy 20 receives the request (operation S202) and performs an authentication (operation S203). The proxy 20 reconfigures the request by using a URL conversion or the like (operation S204).

The proxy 20 attaches a proxy ID and authentication information to the request as a path history (operation S205). The proxy 20 transmits the request to the device 10 (operation S206).

The device 10 receives the request (operation S207) and performs an authentication (operation S208). The device 10 acquires the TD acquired by the application from the proxy 20 (operation S209). The device 10 compares the hash history and the modification history of the acquired TD with the path history described in the request and checks the matching (operation S210).

[Effects]

Returning to FIG. 3, after transmitting the TD of the device 10 to the terminal apparatus 30, when the request generated by using the specification information is received from the terminal apparatus 30, the determination unit 152 determines whether to execute the request. The determination unit 152 makes a determination based on a comparison result between a communication apparatus through which the request passes until the request reaches the device 10 and a communication apparatus through which the TD passes until the TD reaches the terminal apparatus 30. In this way, the device 10, which is an IoT device, compares an actual communication path of the request transmitted by the terminal apparatus 30 which executes the application with the communication path based on the TD in which the rewriting is finished. As a result, according to the Embodiment, the validity of an access from the application to the IoT device is able to be verified. For example, according to the Embodiment, it is possible to verify the reliability of the Web access.

Before the TD, which is transmitted by the device 10 to the terminal apparatus 30 and in which information related to the request transmitted by the terminal apparatus 30 to the device 10 is described, is received by the terminal apparatus 30, the modification unit 203 modifies the content of the TD. The modification history description unit 204 describes, in the TD, the content of the modification, which is modified by the modification process, as a modification history. The modification history verification unit 305 verifies whether the content of the modification indicated by the modification history described in the TD matches the content of the modification permitted in advance. In this way, the terminal apparatus 30 is able to verify the validity of the TD based on the description content of the TD itself. As a result, according to the Embodiment, it is possible to verify the validity of the TD rewriting in the proxy.

The determination unit 152 determines whether to execute the request based on a comparison result between the communication apparatus through which the request passes until the request reaches the device 10 and the communication apparatus, which is defined in the TD acquired by reading a parameter and through which the TD passes until the TD reaches the terminal apparatus 30. The parameter is described in the header of the request transmitted from the terminal apparatus 30 to the device 10. In the parameter, at least information for specifying a predetermined proxy on a communication path and an authentication method in each proxy are described. In this way, the device 10 is able to acquire the TD by coupling the proxy 20.

The modification unit 203 modifies at least any of the values corresponding to the tags included in the TD. The modification history description unit 204 describes the content of the modification, which is modified by the modification process, and information for specifying a tag corresponding to the modified value in the tag value for describing the human-readable information. In this way, the proxy 20 describes information in the description tag value, for example. As a result, according to the Embodiment, information for a verification is able to be added without modifying a format of the existing TD.

In the above example, the number of proxies between the device 10 and the terminal apparatus 30 is one. On the other hand, there may be one proxy or a plurality of proxies between the device 10 and the terminal apparatus 30. For example, one or more proxies 20 provided on the communication path between the terminal apparatus 30 and the device 10 execute the modification process. The modification history description unit 204 of each proxy describes, in the TD, the content of the modification, which is modified by the modification process, and the information for specifying the proxy in which the modification is performed as a modification history.

As an example, a TD modification process when a first proxy and a second proxy are present between the device 10 and the terminal apparatus 30 will be described. The first proxy provided on the communication path between the terminal apparatus 30 and the device 10 executes the modification process and a description process. The first proxy further executes a process of generating a hash from the TD in which the content of the modification is described by the description process. A second proxy provided on the communication path verifies the validity of the hash generated by the first proxy, and further, describes the verification result in the TD.

Figure 10:
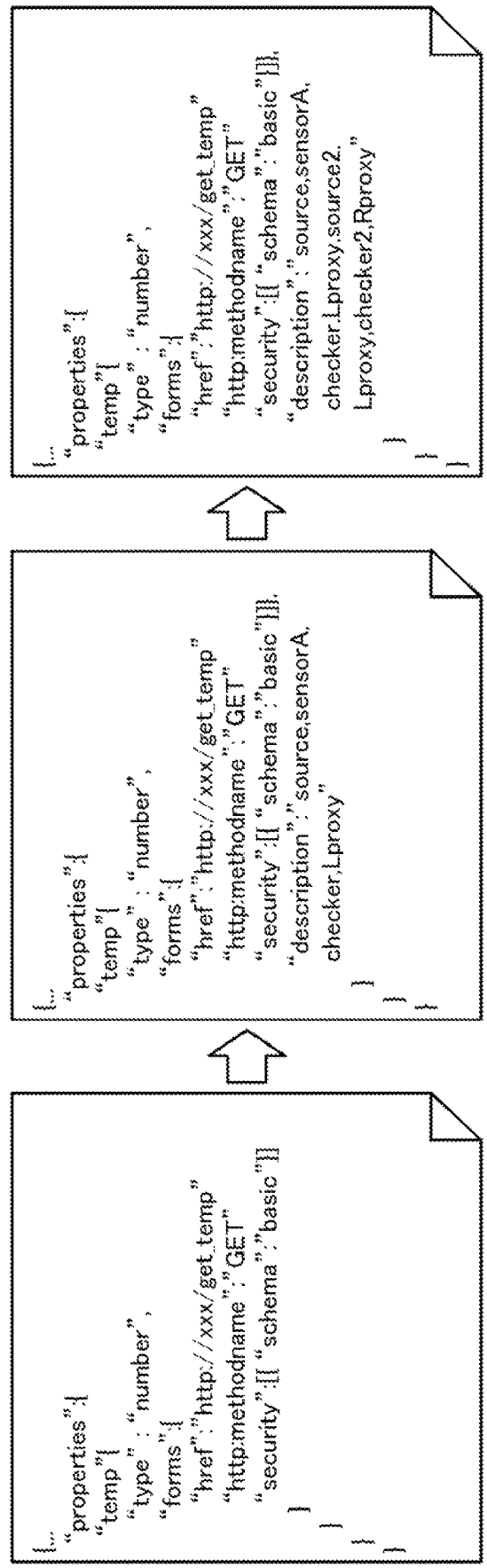
FIG. 10 is a diagram illustrating an example of TDs in which a hash verification history is described.

FIG. 10 is a diagram illustrating an example of TDs in which a hash verification history is described. In this case, each proxy makes a distinction by numbering Key values. For example, the first proxy uses "source" and "checker" as the Key values. The second proxy uses "source2" and "checker2" as the Key values.

[System]

Processing procedures, control procedures, specific names, and information including various kinds of data and parameters indicated in the above-mentioned specification and the drawings may be modified in any manner unless otherwise specified. The specific examples, distributions, numerical values, and the like described according to the embodiment are merely examples and may be freely modified.

The respective components of the respective apparatuses illustrated in the drawings are functional conceptual ones and do not have to be physically configured as illustrated in the drawings. For example, specific forms of distribution and integration of the respective apparatuses are not limited to those illustrated in the drawings. For example, all or some of the apparatuses may be configured to be distributed or integrated functionally or physically in any units depending on various loads, usage conditions, and so on. All or any part of processing functions performed by the respective apparatuses may be realized by a CPU and a program to be analyzed and executed by the CPU or may be realized as hardware by wired logic.

[Hardware]

Figure 11:
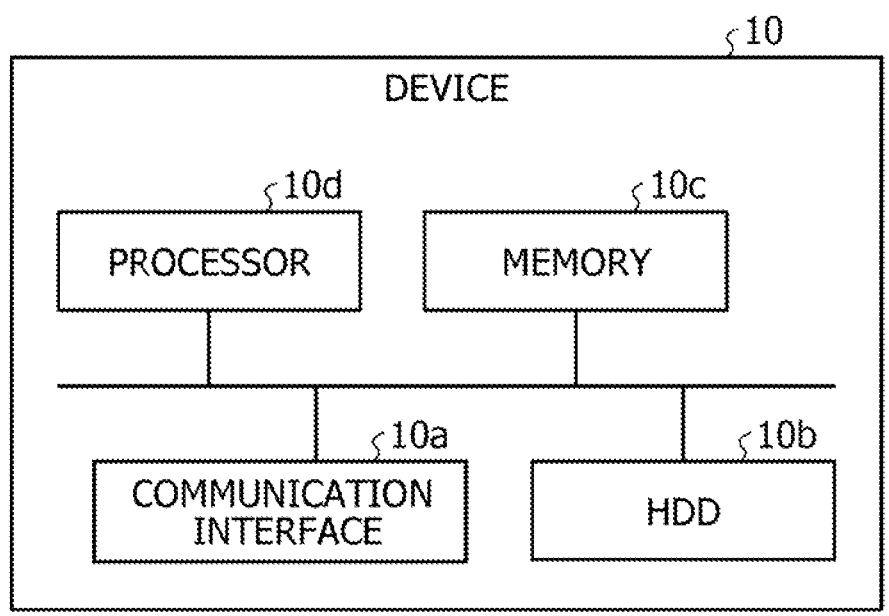
FIG. 11 is a diagram for explaining a hardware configuration example.

FIG. 11 is a diagram for explaining a hardware configuration example. As illustrated in FIG. 11, the device 10 includes a communication interface 10a, a hard disk drive (HDD) 10b, a memory 10c, and a processor 10d. The respective units illustrated in FIG. 11 are coupled to each other by a bus or the like. Similarly, the proxy 20 and the terminal apparatus 30 may have the hardware configuration illustrated in FIG. 11.

The communication interface 10a is a network interface card or the like and performs communication with other servers. The HDD 10b stores a program or a database (DB) for operating functions illustrated in FIG. 3.

The processor 10d is a hardware circuit that reads, from the HDD 10b or the like, a program for executing the same processing as each processing unit illustrated in FIG. 3 and loads the program to the memory 10c to operate a process of executing each function described in FIG. 3 or the like. For example, this process executes the similar function to that of each processing unit included in the device 10. For example, the processor 10d reads out a program having the same functions as those of the TD acquisition unit 151, the determination unit 152, the providing unit 153, and the authentication unit 154 from the HDD 10b and the like. The processor 10d executes a process of executing the same process as the TD acquisition unit 151, the determination unit 152, the providing unit 153, the authentication unit 154, and the like.

As described above, the device 10 operates as an information processing apparatus that performs a learning method as a result of reading and executing the program. The device 10 may also realize the similar functions to those of the embodiments described above by reading the program from a recording medium by a medium reading apparatus and executing the read program. The program described in other embodiments is not limited to a program that is executed by the device 10. For example, the present disclosure may also be similarly applied to cases where another computer or a server executes the program and where the other computer and the server execute the program in cooperation with each other.

This program may be distributed via a network such as the Internet. This program may be recorded on a computer-readable recording medium such as a hard disk, a flexible disk (FD), a compact disc read-only memory (CD-ROM), a magneto-optical disk (MO), or a digital versatile disc (DVD) and may be executed after being read from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control method executed by a processor, the control method comprising:
    modifying a content of specification information before a terminal apparatus receives the specification information in which information related to a request to be transmitted to a device by the terminal apparatus is described, the specification information being transmitted to the terminal apparatus by the device;
    describing a content of a modification, which is modified by the modifying, in the specification information as a modification history; and
    verifying whether the content of the modification matches a content of a modification target list that defines a tag for which modification of a value is permitted.

2. The control method according to claim 1,
    wherein the modifying modifies at least one of values corresponding to tags included in the specification information, and
    wherein the describing describes the content of the modification, which is modified by the modifying, and information for specifying a tag corresponding to the modified value in a tag value for describing human-readable information.

3. The control method according to claim 1,
wherein the modifying is executed by one or more proxies provided on a communication path between the terminal apparatus and the device, and
wherein the describing describes, in the specification information, the content of the modification, which is modified by the modifying, and information for specifying a proxy of the one or more proxies in which the modification is performed, as a modification history.

4. The control method according to claim 1,
wherein the modifying and the describing are executed by a first proxy provided on a communication path between the terminal apparatus and the device,
wherein the first proxy generates a hash by using the specification information in which the content of the modification is described by the describing, and
wherein a second proxy provided over the communication path verifies a validity of the hash and describes a verification result in the specification information.

* * * * *